United States Patent [19]

Ladney, Jr.

[11] 3,889,919

[45] June 17, 1975

[54] VENTING CONSTRUCTION FOR MOLDS FOR FORMING PLASTIC FOAM PARTS

[76] Inventor: Michael Ladney, Jr., 18125 E. Ten Mile Rd., East Detroit, Mich. 48021

[22] Filed: Aug. 20, 1973

[21] Appl. No.: 389,708

Related U.S. Application Data

[63] Continuation of Ser. No. 213,299, Dec. 29, 1971, abandoned.

[52] U.S. Cl. ............... 249/141; 164/410; 425/812; 425/817 R
[51] Int. Cl. ............................................. B29c 1/14
[58] Field of Search ........... 249/141, 113; 425/420, 425/812, 817 R, 4 R; 164/410, 359

[56] References Cited
UNITED STATES PATENTS

| | | | |
|---|---|---|---|
| 2,691,804 | 10/1954 | Lucien et al. | 164/359 X |
| 3,377,662 | 4/1968 | Fukushima | 425/812 X |
| 3,753,544 | 8/1973 | Hodgkins | 249/141 |

FOREIGN PATENTS OR APPLICATIONS

| | | | |
|---|---|---|---|
| 1,016,124 | 1/1966 | United Kingdom | 425/812 X |

Primary Examiner—R. Spencer Annear
Assistant Examiner—Mark Rosenbaum
Attorney, Agent, or Firm—Barnes, Kisselle, Raisch & Choate

[57] ABSTRACT

A plastic vent insert for communicating to atmosphere a molding chamber in which foam plastic parts are molded. The insert, which is preferably made from either polyethylene or polypropylene is mounted in one of the mold members. The vent passage extends through the insert from the molding chamber to atmosphere. Air within the molding chamber and gases generated therein during foaming escape through the passage so that voids are eliminated in the foam part. Any foam which intrudes into the passage may be readily removed.

3 Claims, 3 Drawing Figures

PATENTED JUN 17 1975 3,889,919

INVENTOR
MICHAEL LADNEY JR
BY
Barnes Kisselle Raisch & Choate
ATTORNEYS

VENTING CONSTRUCTION FOR MOLDS FOR FORMING PLASTIC FOAM PARTS

This is a continuation of application Ser. No. 213,299, filed Dec. 29, 1971, now abandoned.

This invention relates to apparatus for molding foamed plastic parts and specifically to an improved venting construction for the mold in which the plastic parts are formed.

One type of mold for forming foamed plastic parts has upper and lower halves which are suitably shaped and constructed to mate together and define an enclosed molding chamber whose shape conforms to that of the part which is to be foamed therein. A foamed part, for example, one of polyurethane foam, may be molded by introducing a mixture of the plastic to be molded and a foaming agent into the molding chamber. The foaming agent causes the plastic to foam and substantially fill the molding chamber. Polyurethane foam cures to form an outer skin around a cellular interior structure. For many polyurethane foam parts, the outer skin provides a decorative appearance and so it is imperative that the molding chamber always completely fill with foam so that the finished part has no surface voids or pockets which can ruin its appearance. Such voids occur because air within the molding chamber and gases generated therein during foaming become entrapped in certain regions of the chamber and restrict the foaming plastic so that the chamber does not completely fill with foam.

In an attempt to correct this problem, it is known to drill vent passages in the mold to communicate the problem regions to atmosphere. The drilled vent passages permit gases which would otherwise be trapped to freely escape to atmosphere as the foaming plastic fills the molding chamber. These drilled vent passages are typically of small cross section and as a result, the intrusion of foaming plastic into the passages is restricted. However, in spite of such restrictive effect, one of the problems associated with drilled vent passages arises because some of the foam does enter the passages. The cured foam in the passage tends to stick to the wall of the vent passage and because it is connected to the foamed plastic part therefore prevents free removal of the part from the mold. Release agents, which may be applied to the molding surface of the mold prior to filling in order to facilitate removal of the foamed part, do not solve the problem because it is difficult to apply them to the walls of the small diameter vent passages. Consequently, upon removal of the part from the mold, the foam stems formed in the vent passages may be torn from the part in such a fashion as to recreate surface defects in the finished part which were intended to be eliminated. A further disadvantage is that residual foam in the vent passages can clog and impair the venting of subsequent molding operations.

Accordingly, the principal object of the invention is to eliminate the aforementioned and other problems attendant with conventional drilled passages by providing an improved venting arrangement and construction for a mold in which foamed plastic parts are formed.

Additional objects, features and advantages of the invention will be seen in the preferred embodiments of the invention set forth in the following specification and drawings wherein.

Figure 1:
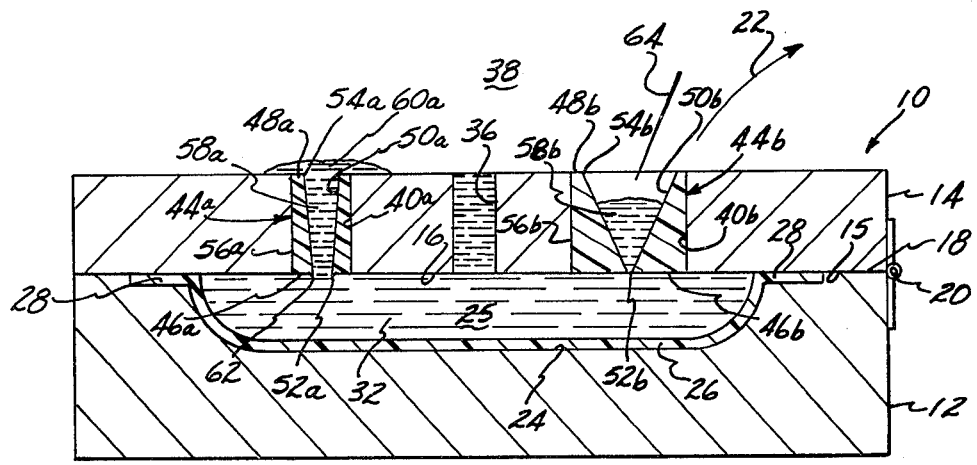
FIG. 1 is a central vertical sectional view through a typical mold for forming plastic foamed parts and showing two embodiments of the improved venting arrangement of the present invention.

In the drawing, there is shown a typical mold 10 (FIG. 1) comprising a lower half, or base, 12 and an upper half, or cover, 14 which are typically steel or aluminum. Cover 14 is shown in the closed position with the outer peripheral margin 15 of its flat lower surface 16 mating with a corresponding peripheral margin 18 of the upper surface of base 12. Cover 14 is pivotally attached to base 12 by means of a hinge 20 and may be swung in the direction of arrow 22 to an open position to allow removal of a foamed plastic part 25 which has been formed in mold 10. A cavity 24 is centrally formed in the upper surface of base 12 and a foam molding cavity 26 preferably constructed of either polyethylene or polypropylene is received in cavity 24. Molding cavity 26 is shaped to seat in cavity 24 with an outer peripheral lip 28 of molding cavity 26 being preferably slightly raised above the upper surface of base 12. With cover 14 in the illustrated closed position, lip 28 is intended to provide a continuous peripheral contact with cover 14 so that a foam molding chamber 32 of the same shape as part 25 is defined by molding cavity 26 and cover 14. An inlet passage 36 in cover 14 extends between the central head space of chamber 32 and atmosphere 38. After the mixture to be foamed is introduced into chamber 32 via passage 36, passage 36 may be suitably plugged by means (not shown) to prevent escape of foam therethrough. Alternatively, inlet 36 is unnecessary when the mold is charged by pouring the mixture into molding cavity 26 with cover 14 open and then closing the cover to enseal the molding chamber.

The improved venting arrangement of the invention comprises holes 40a and 40b (FIG. 1), 40c (FIG. 2) and 40d (FIG. 3) into which are inserted vent inserts 44a through 44d respectively.

Therefore, turning now to detailed description of the structure common to all vent inserts 44 wherein corresponding parts are identified by the same reference numeral and the reference numerals related to each embodiment of insert 44 are similarly literally suffixed, each vent insert 44 has an inner end 46 facing molding chamber 32 and an outer end 48 facing atmosphere 38. A vent passage 50 extends lengthwise through each vent insert between the inner and outer ends thereof. Each vent passage 50 terminates at inner end 46 in an inlet orifice 52 and at outer end 48 in an outlet orifice 54. Each vent insert 44 is preferably made of either acetal, polyethylene or polypropylene which may be either injection molded or extruded. Moreover, each insert 44 is preferably of generally tubular shape so as to have a cylindrical outer surface 56 which may be axially pressed into holes 40 of circular cross section, although it is to be understood that other arrangements may be utilized for mounting the vent inserts in the mold.

It should be pointed out that the sizes of the illustrated vent insert 44 are not necessarily to scale and also that the particular mounting locations of inserts 44 in mold 10 depend upon the particular shape of the foamed plastic part. The size of vent passage 50 must be large enough to permit any air in chamber 32 and gases generated therein to freely escape but small enough to prevent excessive foam loss therethrough. Thus, as foam fills chamber 32, gases escape the chamber via vent passage 50 and thereafter a portion of the foam enters vent passage 50 via inlet orifice 52. Depending upon the amount of foam and the particular volume of vent passage 50, the foam may either only partially fill vent passage 50 or completely fill vent passage 50 with any excess foam overflowing onto the top of cover 14. Thus, in passage 50b of insert 44b in FIG. 1, a partial stem 58b is formed while in passage 50a of insert 44a (FIG. 1), a complete stem 58a is formed with an attached mushroom head, or cap, 60a on top of cover 14.

As can be seen in the two embodiments of FIG. 1, vent passages 50a and 50b taper outwardly toward atmosphere to permit the formed stems 58 to be readily removed from the exterior of the mold. Because of such taper, the smallest cross sectional area of stem 58 is at its point of connection to part 25. Therefore, when stem 58a is removed from insert 44a by peeling cap 60a upwardly away from cover 14, separation from part 25 occurs at inlet orifice 52. While the inner ends 46 of each insert are preferably flush with the lower surface 16 of cover 14 to provide uninterrupted formation of the skin of part 25 in this area, insert 44a is provided with an offset edge 62 around inlet orifice 52 which protrudes slightly below the plane of lower surface 16. This edge 62 enhances the tendency of stem 58a to separate from part 25. This edge is typically very small and the resulting depression in the skin of part 25 is substantially negligible. In the case of insert 44b, inlet orifice 52b is extremely small, and because of the increased taper of vent passage 50b, stem 58b readily separates from part 25 around inlet orifice 52b. Because of the very small diameter of orifice 52b, impairment of the resulting surface on the skin of part 25 is also negligible. It is to be further noted that if necessary, a nylon pick 64 may be used to remove stem 58b should the stem be relatively small and inaccessible for convenient manual gripping.

Figure 2:
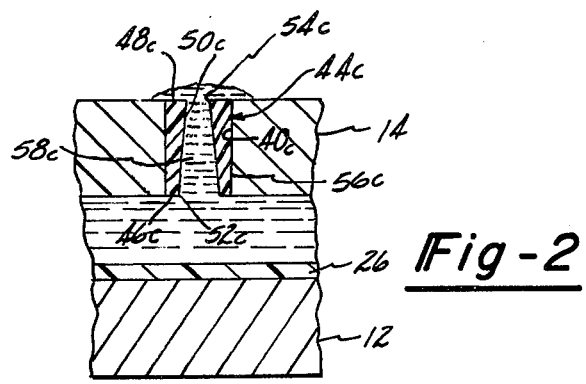
FIG. 2 is a fragmentary view similar to FIG. 1 showing a third embodiment of the invention.
Figure 3:
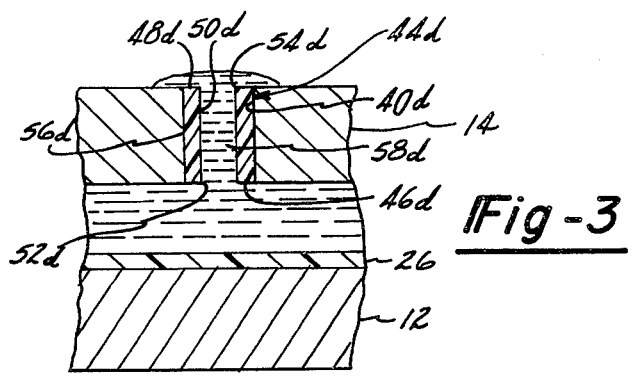
FIG. 3 is likewise a fragmentary view similar to FIG. 1 showing a fourth embodiment of the invention.

Vent passages 50c (FIG. 2) and 50d (FIG. 3) may be employed when it is desired to leave the attachment of stems 58c, 58d to part 25 in tact so that the stems may be later removed by trimming. As can be seen in FIG. 2, passage 50c tapers radially inwardly toward atmosphere 38 and therefore the smallest cross section of passage 50 is at outlet orifice 54c. Any cap, such as 60c, may be peeled away from cover 14 with the cap separating from the stem in the vicinity of outlet orifice 54c; similarly, for insert 44c.

An important consideration in the construction of vent inserts 44 involves the choice of material to be used. The material is preferably a plastic such as acetal, polyethylene or polypropylene from which cured foam readily releases without sticking. Such materials may be either injection molded or extruded to provide mass-produced, relatively cheap inserts. An advantage which arises from a vent insert so connected resides in the ability to achieve a vent passage which is ideally suited for the particular mold with which it is to be used. Because the size of vent passage 50 is somewhat critical in that too large an opening permits excessive loss of foam therethrough, insert 44 may be molded with one of its orifices closed. This orifice may then be opened by a suitable tool to a selected size. Next, the insert may be tried out in its intended application to ascertain how well the selected size performs. If the size is too small, it may be readily enlarged as many times thereafter to achieve the necessary cross-sectional area. On the other hand, if the initially selected size is excessive, the insert may be scrapped and a new insert may be sized smaller. Thus, it can be seen that a marked improvement is provided over conventional drilled vent passages. In practice, for vent inserts of the type illustrated in FIG. 1, a diameter of inlet orifice 52 as small as 0.015 inch has been suitable for one type of part, while diameters of up to 3/16 inch have been necessary for other parts.

I claim:

1. A mold for forming foamed plastic parts comprising, a base and a top cover thereon, said base and cover each having horizontally extending planar surfaces around the periphery thereof which, when the cover is located on said base, define a parting face therebetween, said base and cover cooperating to define a foam molding chamber therebetween in which a workpiece is adapted to be molded, said parting face extending horizontally around the periphery of said foam molding chamber, said cover being separable from said base at said parting face to provide access to said chamber, said cover having a circular cylindrical opening therein extending vertically downwardly from the top outer surface of the cover to said molding chamber, an insert having a circular cylindrical outer surface sized to fit said opening, said insert comprising an integral onepiece member formed of a plastic material selected from the group consisting of acetal, polyethylene and polypropylene, said insert filling said opening and extending upwardly from substantially flush with the cover surface forming the upper portion of said molding chamber to the top outer surface of the cover, said insert having a single vertical passageway of circular cross section extending axially therethrough and concentric with the vertical axis of the opening in the cover so that during the foam molding of the article the air in said chamber is vented vertically upwardly through said passageway and the plastic foam material in the chamber is permitted to expand into abutting relation with the inner end of said insert and into said passageway to form a plug which rises through said passageway to the top surface of the cover whereby to facilitate separation of said plug from foam molded article and to facilitate removal of said plug from within said insert.

2. A mold as called for in claim 1 wherein the passageway in the insert is of generally frustoconical shape in axial section with an increasing cross section in a direction upwardly from the molding chamber so that the plug of foam material which rises in said passageway has its smallest cross section at its junction with the molded article in said chamber.

3. A mold as called for in claim 1 wherein the diameter of said passageway at the upper end of the insert is at least several times the diameter of the passageway at the lower end thereof.

* * * * *

UNITED STATES PATENT OFFICE
CERTIFICATE OF CORRECTION

PATENT NO. : 3,889,919
DATED : June 17, 1975
INVENTOR(S) : Michael Ladney, Jr.

It is certified that error appears in the above-identified patent and that said Letters Patent are hereby corrected as shown below:

Column 4, Line 59  Cancel "1" and insert -- 2 --

Signed and Sealed this fifteenth Day of June 1976

[SEAL]

Attest:

RUTH C. MASON
Attesting Officer

C. MARSHALL DANN
Commissioner of Patents and Trademarks